3,274,298
COATING COMPOSITION FOR COMPOSITE
PACKAGING SHEETS
John T. Massengale, West Chester, and Walter T. Koch, Drexel Hill, Pa., assignors to FMC Corporation, Philadelphia, Pa., a corporation of Delaware
No Drawing. Filed June 1, 1964, Ser. No. 371,812
5 Claims. (Cl. 260—898)

This invention relates to a coating composition and composite packaging sheets. More particularly it relates to a flexible polymer base sheet coated with a blend of specified vinylidene chloride interpolymers.

It is a principal object of this invention to provide a composite packaging sheet having improved anchorage between the vinylidene chloride interpolymer coating composition and the flexible polymer base.

It is another object of this invention to provide a composite packaging sheet wherein a vinylidene chloride interpolymer coating surface has a reduced electrostatic "pick-up" tendency.

It is another object of this invention to provide a coating composition having improved printability whereby special heat resistant inks for polymer coatings will adhere more firmly thereto.

It is another object of this invention to provide a coating composition which can be "tailored" to fit specified anchoring needs without causing any appreciable increase in moisture transmission.

These and other objects are accomplished in accordance with this invention which comprises a composite packaging sheet having a flexible polymer base sheet and a smooth, non-particulate coating on at least one side thereof of a blend of from about 65 to 98% by weight of a copolymer of from 80 to 92 parts vinylidene chloride and from 20 to 8 parts acrylonitrile with from about 35 to 2% by weight of an interpolymer of from 70 to 90 parts of vinylidene chloride, from 5 to 25 parts of methacrylic acid and/or acrylic acid and from 0 to 10 parts of a monomer selected from the group consisting of acrylonitrile, lower alkyl acrylates and lower alkyl methacrylates. The lower alkyl acrylates and methacrylates are those having from 1 to 6 carbon atoms in the alkyl group.

The use of a blend component copolymer of vinylidene chloride and a relatively high proportion of methacrylic or acrylic acid has a distinct advantage over the incorporation of methacrylic or acrylic acid in the major film-forming copolymer system. The single copolymer system is inflexible and requires specialty manufacture and coating development while the blend can be made with a commercially available copolymer in varying amounts to "tailor" the coating composition to specific needs. Methacrylic and/or acrylic acid are expensive resin components and, with the present invention can be utilized economically.

The use of this carboxyl radical containing component increases adhesion between the coating and the base sheet and does not deleteriously affect the low moisture vapor transmission rate of the sheet. In addition, this material improves printing and will reduce the static electricity "build up" tendency of films coated therewith.

In a preferred embodiment, the major copolymer component is one having 90 parts vinylidene chloride and 10 parts of acrylonitrile and is present in the blend in an amount ranging from 80-90% by weight. The minor copolymer component has from about 75 to 85 parts of vinylidene chloride and from about 25 to 15 parts of methacrylic acid, acrylic acid or mixtures of these acids. The vinylidene chloride interpolymers are prepared by any conventional polymerization techniques although the continuous emulsion process is the preferred method for preparation.

The interpolymers are blended together in a suitable organic solvent such as a mixture of toluene and tetrahydrofuran, or methylethyl ketone and toluene, and the like. To this solution, coating additives which enhance surface characteristics are added, if desired. Waxes and wax-like materials are advantageously added to the coating solution in amounts up to about 5% based on the weight of the coating. Waxes include hydrocarbon waves such as paraffin wax, microcrystalline hydrocarbon wax, hydrogenated castor oil, spermaceti wax, palm wax, benzyl stearate, reaction products of ethylene diamine and higher fatty acids and the like.

Clays or clay dispersions in an inert organic liquid such as toluene are also advantageously incorporated in the solution in amounts up to about 5% based on the weight of the coating solids to improve slip and blocking characteristics of the coated sheet.

Flexible polymer sheets of this invention include, for example, those prepared from regenerate cellulose; cellulose ethers such as hydroxyethyl cellulose, methyl cellulose, carboxymethyl cellulose, etc.; cellulose esters such as cellulose acetate, cellulose nitrate, etc.; xylan, amylose, polyvinyl chloride, polyethylene terephthalate, polycarbonate, and polymonoolefin.

These sheets may be anchor treated as with extremely thin coatings or impregnations of thermosetting resins and polyalkyleneimines, or with acid treatments, or with oxidation treatments, or by electrical discharge treatments, whichever best suits the particular base material used. The preferred base material for this invention is regenerated cellulose film which has been anchor treated with a light impregnation of melamine-formaldehyde precondensate resin.

The following example is set forth to demonstrate the invention.

*Example I*

Film samples of regenerated cellulose film having a thickness of 0.9 mil and containing 0.2% of melamine-formaldehyde precondensate resin and 0.021% of a polyoxyethylene derivative of sorbitan monolaurate were coated with lacquers having various compositions. The following table shows these compositions and coating properties of film samples coated therewith. The lacquer solvent was 65/35 mixture of toluene and tetrahydrofuran and the solvent contained 15% solids by weight.

TABLE I

| Coating Component | Film Samples Coating Composition, Parts by weight | | |
|---|---|---|---|
| | A | B | C |
| VCl$_2$–ACN Copolymer [1] | 100 | 90 | 80 |
| VCl$_2$–MA Copolymer [2] | 0 | 10 | 20 |
| High Melting Point Wax | 2.75 | 2.75 | 2.75 |
| Clay | 0.9 | 0.9 | 0.9 |
| Properties: | | | |
| Appearance | clear | clear | clear |
| Blocking | none | none | none |
| MVTR [3] | 26 | 26 | 31 |
| Boiling Water | | | |
| Test-seconds [4] | 20 | 30 | 45 |

[1] Copolymer of 90% by weight vinylidene chloride and 10% acrylonitrile.
[2] Copolymer of 84% by weight vinylidene chloride and 16% methacrylic acid.
[3] Moisture vapor transmission rate of the coated film at 100° F and 95% relative humidity in grams per square meter per 24 hour period.
[4] Test procedure wherein anchorage strength is tested under severe conditions. Strips of the same test sample are heated together to provide a two inch seal. One of the strips has a section of coating removed therefrom and the other strip is sealed to it so that it will pull against an exposed edge of the coating when the two strips are pulled apart. The ends of each strip are left unsealed. One of these ends is clamped at a fixed position. The other end has a hanging weight clamped thereon and the heat sealed portion is immersed in boiling water. At the time of immersion a stopwatch is started and the length of time necessary to strip the two inch seal is noted.

As can be seen from the table, the adhesion of the coating to the base film in the severe boiling water test increases as the amount of the methacrylic acid containing copolymer resin is increased while the moisture vapor transmission is not appreciably affected.

*Example II*

Film samples were also prepared using the base film described in Example I, but with a slightly different coating formulation. The lacquer solvent was also the same as in Example I.

The following table shows the coating composition and various properties for the coated film samples.

TABLE II

| Coating Component | Film Samples Coating Composition, Parts by weight | |
|---|---|---|
| | A | B |
| $VCl_2$—ACN Copolymer [1] | 100 | 95 |
| $VCl_2$—MA–AA–EA Copolymer [2] | 0 | 5 |
| Properties: | | |
| Heat Seal, gms | 410 | 440 |
| Boiling Water Test, sec | 12 | 23 |
| Ink Anchorage of Heat Resistant Ink | poor | good |

[1] Copolymer of 90% by weight of vinylidene chloride and 10% acrylonitrile.
[2] Copolymer of 80% by weight of vinylidene chloride, 10% methacrylic acid, 5% acrylic acid and 5% ethyl acrylate.

The last named property showed that the coating of the invention permits much improved adhesion of heat resistant inks to polymer coatings over the conventional coating material.

Various changes and modifications may be made practicing the invention without departing from the spirit and scope thereof and, therefore, the invention is not to be limited except as defined in the appended claims.

We claim:

1. A coating composition comprising an organic solvent solution of a blend of (1) from about 65 to 98% by weight of a copolymer of from 80 to 92 parts vinylidene chloride and from 20 to 8 parts acrylonitrile with (2) from about 35 to 2% by weight of an interpolymer of from 70 to 90 parts of vinylidene chloride, from 5 to 25 parts of a monomer selected from the group consisting of methacrylic acid, acrylic acid and mixtures thereof and from 0 to 10 parts of a monomer selected from the group consisting of acrylonitrile, lower alkyl acrylates and lower alkyl methacrylates.

2. A coating composition comprising an organic solvent solution of a blend of from about 80 to 90% by weight of a copolymer of about 90 parts vinylidene chloride and about 10 parts of acrylonitrile with from about 20 to 10% by weight of a copolymer of from 75 to 85 parts vinylidene chloride and from about 25 to 15 parts of a monomer selected from the group consisting of methacrylic acid, acrylic acid and mixtures thereof.

3. A composite packaging sheet comprising a flexible polymer base sheet and a smooth, non-particulate coating thereon of a blend of (1) from about 65 to 98% by weight of a copolymer of from 80 to 92 parts vinylidene chloride and from 20 to 8 parts acrylonitrile with (2) from about 35 to 2% by weight of an interpolymer of from 70 to 90 parts of vinylidene chloride, from 5 to 25 parts of a monomer selected from the group consisting of methacrylic acid, acrylic acid and mixtures thereof and from 0 to 10 parts of a monomer selected from the group consisting of acrylonitrile, lower alkyl acrylates and lower alkyl methacrylates.

4. The composite packaging sheet of claim 3 wherein the flexible base sheet is a regenerated cellulose film.

5. A composite packaging sheet comprising a regenerated cellulose base film and a smooth, non-particulate coating on at least one side thereof comprising a blend of from about 80 to 90% by weight of a copolymer of from about 90 parts vinylidene chloride and from about 10 parts acrylonitrile with from about 20 to 10% by weight of a copolymer of from 75 to 85 parts vinylidene chloride and from about 25 to 15 parts of a monomer selected from the group consisting of methacrylic acid, acrylic acid and mixtures thereof.

References Cited by the Examiner

UNITED STATES PATENTS

| 3,029,214 | 4/1962 | Hobson | 260—895 |
| 3,066,043 | 11/1962 | Hechtman et al. | 260—899 |
| 3,108,017 | 10/1963 | Messwarb et al. | 260—899 |
| 3,144,425 | 8/1964 | Koch et al. | 260—898 |

SAMUEL H. BLECH, *Primary Examiner.*

MURRAY TILLMAN, *Examiner.*

J. WHITE, *Assistant Examiner.*